United States Patent
Streuer

(10) Patent No.: US 8,528,773 B2
(45) Date of Patent: Sep. 10, 2013

(54) VALVE STOPPER

(75) Inventor: Peter Streuer, Hannover (DE)

(73) Assignee: Johnson Controls Autobatterie GmbH & Co. KGaA, Hannover (DE)

(*) Notice: Subject to any disclaimer, the term of this patent is extended or adjusted under 35 U.S.C. 154(b) by 315 days.

(21) Appl. No.: 12/809,178

(22) PCT Filed: Oct. 2, 2008

(86) PCT No.: PCT/EP2008/008368
§ 371 (c)(1),
(2), (4) Date: Jul. 16, 2010

(87) PCT Pub. No.: WO2009/077023
PCT Pub. Date: Jun. 25, 2009

(65) Prior Publication Data
US 2010/0314393 A1   Dec. 16, 2010

(30) Foreign Application Priority Data

Dec. 19, 2007 (DE) .................. 10 2007 061 784

(51) Int. Cl.
*B65D 51/16* (2006.01)
*B65D 51/18* (2006.01)
(52) U.S. Cl.
USPC .................. 220/360; 220/203.16; 220/254.3
(58) Field of Classification Search
USPC .................. 220/360, 203.13, 203.15, 203.16, 220/203.18, 254.3
See application file for complete search history.

(56) References Cited

U.S. PATENT DOCUMENTS

| 4,658,979 | A | * | 4/1987 | Mietz et al. ............. 220/203.13 |
| 5,031,785 | A | * | 7/1991 | Lemme ........................ 215/228 |
| 5,490,867 | A | | 2/1996 | Kozawa et al. |
| 6,651,834 | B2 | * | 11/2003 | Wong ............................ 215/260 |
| 2003/0198863 | A1 | | 10/2003 | Murashige et al. |

FOREIGN PATENT DOCUMENTS

| DE | 297 14 031 U1 | 10/1997 |
| DE | 103 49 395 B3 | 1/2005 |
| EP | 0 601 491 A | 6/1994 |
| EP | 1 001 905 B1 | 5/2000 |
| EP | 1 194 962 B1 | 10/2002 |
| WO | WO 01/82395 A | 11/2001 |

* cited by examiner

*Primary Examiner* — Mickey Yu
*Assistant Examiner* — Niki Eloshway
(74) *Attorney, Agent, or Firm* — Boardman & Clark LLP

(57) ABSTRACT

A valve stopper for sealing a vessel opening with a valve body which may be applied to the vessel opening made from a first rigid plastic material and a valve element integrally connected to the valve body made from a second elastic plastic material is disclosed. The valve element has a sealing surface section which may be brought into contact with a support edge and a connector piece, running from the sealing surface section which may be brought into contact with a support edge and a connector piece, running from the sealing surface section to support surface of the valve body facing the vessel opening and at a distance from the interposed valve element. The sealing surface section extends over the connector piece over the whole circumference thereof, the connector piece having at least one defining recess in a given valve opening region of the sealing surface section, such that in the region of the recess the radial separation of the connector piece to the adjacent outer edge of the sealing surface section is greater than in the remaining region and the connector piece does not from a contact surface for the sealing surface section in the region of the recess and the sealing surface section has a circumferential bead on the surface thereof provided for contact with the contact edge.

19 Claims, 2 Drawing Sheets

VALVE STOPPER

CROSS REFERENCE TO RELATED PATENT APPLICATIONS

This application is a national application of PCT/EP2008/008368 which claims priority to and the benefit of German Patent Application DE 10 2007 061 784.6, the entireties of both of which are incorporated herein by reference.

BACKGROUND

Valve stoppers are used in particular to close filling and checking holes in storage batteries, in particular in lead-acid batteries for motor vehicles. The valve elements fitted in the valve stopper are designed to allow gas to escape, should excess pressure arise in the battery case.

It is known from EP 1 194 962 B1, for example, to place a resilient cap onto a tubular neck, which defines a container opening in a battery cell. A separate closing cover sealing the battery lid is positioned above the resilient cap. In the event of excess pressure, gas may escape from inside the cell to the outside through the interspace between tubular neck and resilient cap due to the resilient deformability of the resilient cap.

EP 1 001 905 B1 discloses a sealing valve of rubber-elastic material with a stopper member, which may be introduced into a container opening as far as a stopper collar projecting radially beyond the stopper member. At least one control channel is fashioned on the stopper member in the form of a recess in the stopper member, which channel extends in the direction of the longitudinal axis of the sealing valve from the bottom of the stopper member as far as the stopper collar. A sealing bead is formed on the stopper collar, which bead may be placed sealingly onto a container edge enclosing the container opening. In addition, the control channel in the stopper member is extended as far as the sealing bead.

DE 103 49 395 B3 discloses a valve stopper in which a valve of a resilient material is formed in one piece on a base body, such that the valve and the base body form a multicomponent injection molding. The one-piece resilient valve in the form of a molding has a valve body and a sealing tab formed thereon, which is thinner in cross section than the valve body. The sealing tab is formed at the lower outer edge area of the valve body and takes the form of a semicircular disc, which rests for sealing purposes against the inner edge of a sleeve in the valve body.

SUMMARY

The invention relates to a valve stopper for sealing a container opening, having a valve body which may be placed on the container opening and is made of a first, rigid plastics material and a valve element connected integrally with the valve body and made from a second, resilient plastics material, which is more resilient than the first plastics material, the valve element having a sealing surface portion which may be placed on a contact edge defining the container opening and a connecting member which extends from the sealing surface portion to a contact surface of the valve body directed towards the container opening and arranged at a distance therefrom with the interposed valve element.

Against the background, the object of the invention is to provide an improved valve stopper for sealing a container opening, with a valve element which responds reliably at a defined pressure.

The object is achieved with the valve stopper of the abovementioned type in that the sealing surface portion projects over its entire circumference beyond the connecting member, the connecting member has at least one recess adjoining an intended valve opening region of the sealing surface portion, such that in the region of the at least one recess the radial distance between the connecting member and the adjacent outer edge of the sealing surface portion is greater than elsewhere and in the region of the recess the connecting member does not form a support for the sealing surface portion, and in that the sealing surface portion has a circumferential bead on its surface provided for resting against the contact edge at the container opening.

The recess in the connecting member formed integrally with the sealing surface portion ensures that the resilient region is more flexible at this point than over the rest of the circumference of the connecting member pressing the sealing surface portion onto the contact edge. This makes possible a defined response of the valve function in this region. The defined response is additionally ensured by the bead, which reduces the risk of the sealing surface portion sticking together with the contact edge of the container opening.

The connecting member is preferably cylindrical. The connecting member thus forms a stem for the circular sealing surface portion. The connecting member may be arranged for example concentrically with the circular sealing surface portion. It is however also feasible for the connecting member to be polygonal, such as for example triangular, quadrilateral, pentagonal etc. it is advantageous in this respect for the connecting member to have a recess which cross-sectionally takes the form of a segment of a circle or a recess which is cross-sectionally angular. By matching the shape of the recess to the shape of the connecting member, a tailor-made valve opening region may be produced.

It is crucial for the connecting member to hold the sealing surface portion firmly against the valve body, such that the sealing surface portion does not give resiliently in the region of the connecting member, while the defined recesses, in which the sealing surface portion is not held by the connecting member, ensure the desired resilience of the sealing surface portion, the shape of the connecting member and of the recess essentially determining the desired response pressure of the valve element.

In order to obtain a reliable valve stopper member which is cheap to mass produce, the connecting member of the valve element preferably develops into a wider portion accommodated in an annular indentation in the cover member bearing the contact surface of the valve body. In this way it is ensured that the connecting member is firmly fitted into the cover member.

It is particularly advantageous for the wider portion to be guided radially outwards through an opening in the valve body and to be connected integrally with an annular seal formed on the outside of the valve body. In this way, a one-piece embodiment of the valve element of the annular seal is achieved, which are stably borne in the valve body merely due to their arrangement. In addition, manufacture is simplified by the reduced number of injection points for the two different material components.

The valve stopper is preferably configured for use in a filling and checking hole of a storage battery, in particular a lead starter battery and has to this end for example an external thread arranged at a suitable point for screwing the valve stopper into the filling and checking hole and one or two mutually spaced but adjacent annular seals.

BRIEF DESCRIPTION OF THE DRAWINGS

The invention is explained in greater detail below with reference to an exemplary embodiment and the attached drawings, in which.

DETAILED DESCRIPTION

Figure 1:
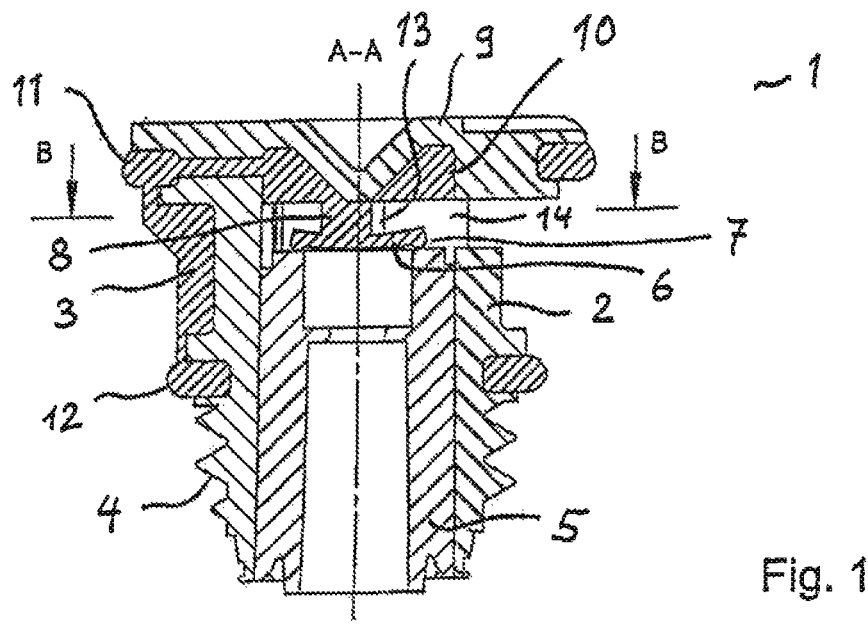
FIG. 1 is a cross-sectional view of a valve stopper for screwing into a double lid of a lead battery, along the angled section A-A (FIG. 3)

FIG. 1 is a cross-sectional view of one embodiment of a valve stopper 1, which is provided for screwing into a double lid of a lead battery. As is known per se, a double lid has a lower lid adjoining the cell compartment, a cavity bounded by webs and an upper lid sealing the lid at the top. The webs extending between the lower and upper lids provide labyrinths, through which a gas stream may be conveyed to a vent opening and in which electrolyte may be collected and returned to the cells.

Figure 3:
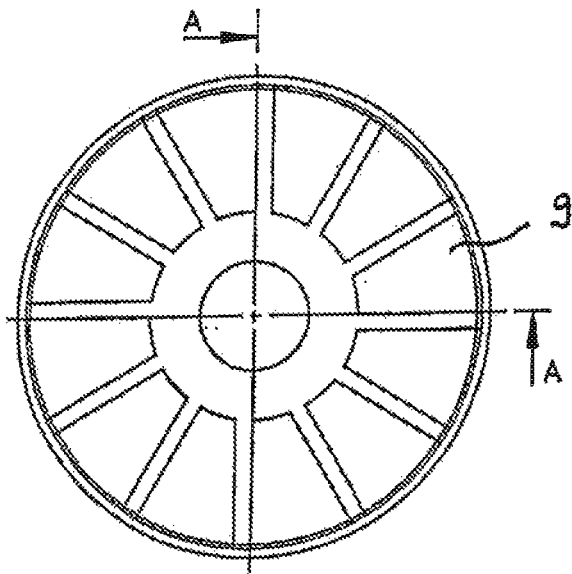
FIG. 3 is a plan view of the valve stopper of FIG. 1.

The cross-section A-A shown is a corner section, the left-hand half extending from the upper point A shown in FIG. 3 to the center and the right-hand half, offset by 90°, extending from the center to the point A on the right-hand side of the plan view. The valve stopper 1 has a valve body 2, which is made from a first, rigid plastics material, such as for example polypropylene PP. A valve element 3 of a second, resilient plastics material is formed integrally on the valve body 2. The second, resilient plastics material may be a rubber-elastic material, for example. Fluoroelastomers, silicone rubber materials or other thermoelastic elastomers are suitable.

An external thread 4 is formed on the valve body 2, for screwing the valve stopper 1 into a container opening.

A stopper member 5 is additionally inserted in the valve body 2, said stopper member being introduced into the valve body 2 after molding of the valve body 2 and the valve element 3 connected integrally therewith. The stopper member 5 may be connected firmly with the valve body 2 in the bottom region by welding or thermoplastic deformation. The valve stopper 1 is produced by firstly molding the valve body 2 using the injection molding process. Then the second, resilient material is injected into the valve body 2 with the aid of a suitable mold, to form the valve element 3. The valve element 3 has a substantially discoid sealing surface portion 6, which bears a peripheral annular bead 7 at its outer edge facing the stopper member 5. The sealing surface portion 6 is borne by a connecting member 8, which is joined at the opposite end from the sealing surface portion 6 to a cover member 9 of the valve body 2. To this end, an annular indentation 10 is provided in the cover member 9 for accommodating the second, resilient plastics material connected to the connecting member 8. The indentation 10 is preferably such that the cover member 9 tapers conically towards the central axis of the valve stopper 1, so supporting the connecting member 8 in the center by the first, more rigid plastics material of the valve body 2.

The second, resilient plastics material is guided outwards via an injection hole, in order to form a first annular seal 11 at the upper periphery of the valve body 2 and, at a distance therebelow adjacent the thread 4, a second annular seal 12 for the lower lid. The first annular seal 11 is provided for the upper lid.

The sealing surface portion 6 projects over its entire circumference beyond the connecting member 8, in order in this way to rest resiliently on the stopper member 5. Furthermore, at least one recess 13 is provided in the connecting member 8, in the region of which recess the sealing surface portion 6 does not rest on the connecting member 8. As a result of the recess 13 the resilient region is made more flexible than in the surrounding region of the sealing surface portion, so allowing a defined valve function response in this region. In the region of the recess 13 a vent channel 14 is provided in the valve stopper 1, which adjoins a vent channel in the double lid (not shown).

Figure 2:
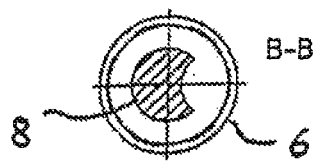
FIG. 2 is a plan view of a section B-B of the resilient valve element.

FIG. 2 shows a sectional view through the connecting member 8 with the sealing surface portion 6 connected thereto. It is clear that the connecting member 8 is cylindrical and has a recess 13 in the shape of a segment of a circle, such that the connecting member 8 is set back in the region of the recess from a plane which is defined by the opposing outer edges of the recess 13 at the point of transition to the connecting member 8.

The section B-B of FIG. 2 is shown in FIG. 1.

Figure 4:
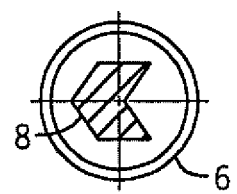
FIG. 4 is a plan view of an alternative embodiment of the plan view of section B-B of the resilient valve element shown in FIG. 2.

Instead of a cylindrical connecting member 8, however, it is also feasible to select an angular connecting member, for example even a triangular, quadrilateral, or polygonal connecting member (see FIG. 4). The recess 13 does not have to take the form of a segment of a circle. It may likewise also be polygonal (see FIG. 4).

FIG. 3 shows a plant view of the valve stopper 1 of FIG. 1. It is clear therefrom how section AA of FIG. 1 passes around the corner. It is also clear that the cover member 9 has a conically tapering indentation in the center, which forms a central support for the connecting member 8.

The invention claimed is:

1. A valve stopper (1) for sealing a container opening, comprising a valve body (2) which may be placed on the container opening and is made of a first, rigid plastics material, a sealing surface portion (6) which may be placed sealingly on a contact edge bounding the container opening, and a connecting member (8) which extends from the sealing surface portion (6) to a contact surface of the valve body (2) directed towards the container opening, the sealing surface portion (6) and the connecting member (8) consisting of a second, resilient plastics material, which is more resilient than the first plastics material, and arranged at a distance therefrom with the interposed valve element (3), wherein the sealing surface portion radially projects over its entire circumference beyond the connecting member, the connecting member (8) has at least one recess (13) adjoining an intended valve opening region of the sealing surface portion (6), such that in the region of the recess the radial distance between the connecting member (8) and the adjacent outer edge of the sealing surface portion is greater than elsewhere and in the region of the recess the connecting member (8) does not form a support for the sealing surface portion (6), and the sealing surface portion has a circumferential bead (7) on its surface provided for resting against the contact edge.

2. The valve stopper (1) as claimed in claim 1, wherein the connecting member (8) is cylindrical.

3. The valve stopper (1) as claimed in claim 1, wherein the connecting member (8) is polygonal.

4. The valve stopper (1) as claimed in claim 1, wherein the connecting member has a recess which cross-sectionally takes the form of a segment of a circle.

5. The valve stopper (1) as claimed in claim 1, wherein the connecting member (8) has a recess which is cross-sectionally angular.

6. The valve stopper (1) as claimed in claim 1, wherein the connecting member (8) of the valve element (3) develops into a wider portion accommodated in an annular indentation in the cover member (9) bearing the contact surface of the valve body (2).

7. The valve stopper (1) as claimed in claim 6, wherein the wider portion is guided radially outwards through an opening in the valve body (2) and is connected integrally with at least one annular seal (11, 12) formed on the outside (2) of the valve body.

8. The valve stopper (1) as claimed in claim 1, wherein the valve stopper (1) is configured for use in a filling and checking hole of a storage battery, in particular a lead battery.

9. The valve stopper (1) as claimed in claim 1, wherein the valve stopper (1) comprises a valve element (3) connected integrally with the valve body (2) and made from a second, resilient plastics material, which is more resilient than the first plastics material.

10. The valve stopper (1) as claimed in claim 9, wherein the valve element (3) comprises the sealing surface portion (6) and the connecting member (8).

11. A valve stopper for sealing a container opening, comprising a valve body which may be placed on the container opening and is made of a first, rigid plastics material, a sealing surface portion which may be placed sealingly on a contact edge bounding the container opening, and a connecting member which extends from the sealing surface portion to a contact surface of the valve body directed towards the container opening, the sealing surface portion and the connecting member consisting of a second, resilient plastics material, which is more resilient than the first plastics material, and arranged at a distance therefrom with the interposed valve element, wherein the connecting member forms a stem for the sealing surface portion, such that the sealing surface portion projects over its entire circumference beyond the connecting member, the connecting member has at least one recess adjoining an intended valve opening region of the sealing surface portion, such that in the region of the recess the radial distance between the connecting member and the adjacent outer edge of the sealing surface portion is greater than elsewhere and in the region of the recess the connecting member does not form a support for the sealing surface portion, and the sealing surface portion has a circumferential bead on its surface provided for resting against the contact edge.

12. The valve stopper of claim 11, wherein the connecting member is arranged concentrically with the sealing surface portion.

13. The valve stopper of claim 11, wherein the connecting member is cylindrical.

14. The valve stopper of claim 11, wherein the connecting member is polygonal.

15. A valve stopper for sealing a container opening, comprising a valve body which may be placed on the container opening and is made of a first, rigid plastics material, a sealing surface portion which may be placed sealingly on a contact edge bounding the container opening, and a connecting member which extends from the sealing surface portion to a contact surface of the valve body directed towards the container opening, the sealing surface portion and the connecting member consisting of a second, resilient plastics material, which is more resilient than the first plastics material, and arranged at a distance therefrom with the interposed valve element, wherein the sealing surface portion projects over its entire circumference beyond the connecting member, the connecting member has at least one recess adjoining an intended valve opening region of the sealing surface portion, such that in the region of the recess the radial distance between the connecting member and the adjacent outer edge of the sealing surface portion is greater than elsewhere and in the region of the recess the connecting member does not form a support for the sealing surface portion, and the sealing surface portion is substantially discoid and has a circumferential bead on its outer edge facing the contact edge.

16. The valve stopper as claimed in claim 15, wherein the connecting member is cylindrical.

17. The valve stopper as claimed in claim 15, wherein the connecting member is polygonal.

18. The valve stopper as claimed in claim 15, wherein the connecting member has a recess which cross-sectionally takes the form of a segment of a circle.

19. The valve stopper as claimed in claim 15, wherein the connecting member has a recess which is cross-sectionally angular.

* * * * *